W. C. CARR.
STEERING APPARATUS FOR MOTOR TRUCKS.
APPLICATION FILED OCT. 26, 1917.
1,297,095.
Patented Mar. 11, 1919.
2 SHEETS—SHEET 1.
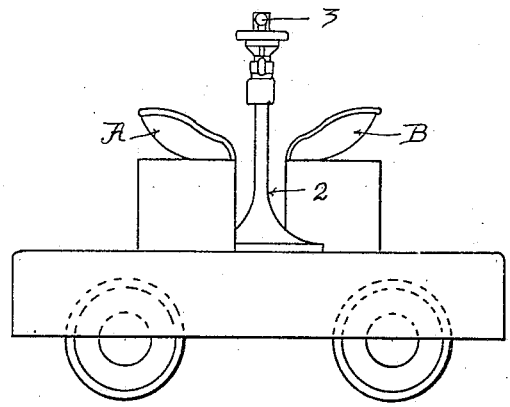
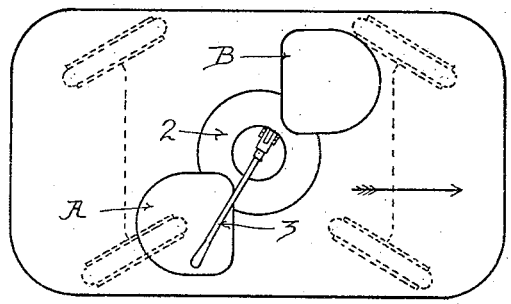
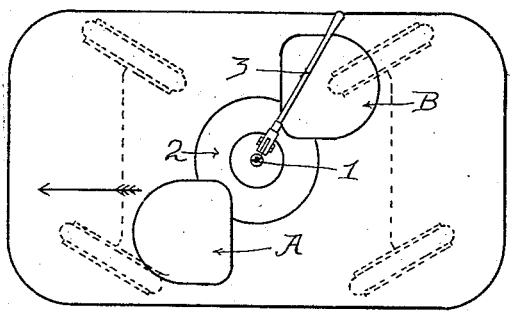
Inventor:
William C. Carr
by Wm S Macomber
Atty.

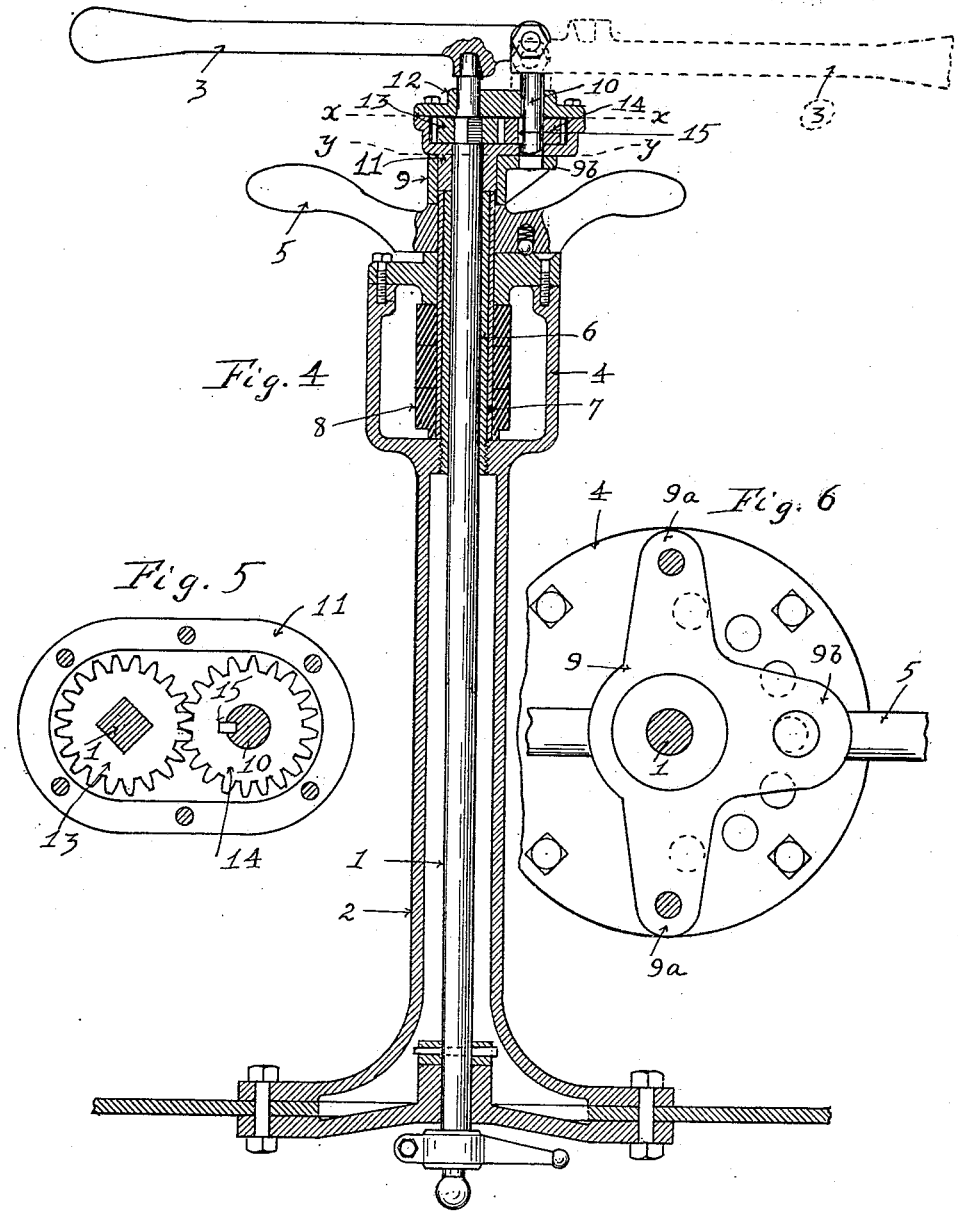

UNITED STATES PATENT OFFICE.

WILLIAM C. CARR, OF BUFFALO, NEW YORK.

STEERING APPARATUS FOR MOTOR-TRUCKS.

1,297,095.   Specification of Letters Patent.   Patented Mar. 11, 1919.

Application filed October 26, 1917. Serial No. 198,604.

*To all whom it may concern:*

Be it known that I, WILLIAM C. CARR, a citizen of the United States, residing at Buffalo, in the county of Erie and State of New York, have invented certain new and useful Steering Apparatus for Motor-Trucks, of which the following is a specification.

This invention relates to steering apparatus for motor trucks.

In the use of motor trucks which are adapted to be run in either direction, it becomes necessary that a single steering lever be employed and so arranged that the movement of such lever shall be, with reference to the position of the driver facing one direction or the other, the same in its steering movement. This is especially necessary in trucks adapted to hauling trailers from either end of the truck.

The object of my invention is, therefore, to provide a steering apparatus so constructed that the same movement of the steering lever will effect steering movement in like directions whichever way the driver is facing. This and other objects will be evident from the following specifications and claims and from the drawings in which,—

Figure 1 is a diagrammatic outline in side elevation of a truck provided with my improvement.

Figs. 2 and 3 are diagrammatic plan views.

Fig. 4 is a vertical central section of my invention.

Fig. 5 is an enlarged section on $x$—$x$, Fig. 4.

Fig. 6 is an enlarged section on $y$—$y$, Fig. 4.

Referring first to Figs. 1 to 3, I have there shown my invention applied to a truck wherein all four wheels are knuckle-joint steered from a common steering position in well-known manner. The steering-post 1 is mounted in a pedestal 2 which is located preferably centrally on the platform of the truck and has a steering-handle 3. Oppositely-facing seats A and B are provided, and the steering-handle 3 swings transversely to bring it in front of the driver in either seat. When the truck is to be driven in the direction of the arrow in Fig. 2, the lever 3 is in front of the seat A which the driver then occupies, and moving the lever 3 clockwise steers the truck to the right. If now the driver desires to drive the truck in the opposite direction, he takes the seat B and swings the lever 3 in front of that seat, as shown in Fig. 3. If now he moves the lever toward him, clockwise as in the former case, if the lever were pivoted directly to the steering-head, the truck would be turned to the left, instead of to the right. This not only would tend to absorb the attention of the driver, but in the frequent change of direction of movement of the truck would result in mistake in movement and consequent collision or damage due to wrong steering. Hence my invention which operates to secure the same steering movement by the same lever movement, which I will now describe by reference to Figs. 4 to 6.

The steering-post 1 is mounted within the pedestal 2, which is rigidly secured to the truck. The steering-lever 3 is capable of occupying the two positions shown in full line and broken line in Fig. 4, and also shown in Figs. 2 and 3. The pedestal 2 has the casing 4 which contains the drum and contacts of the electric controller, the controller handle being shown at 5. Since the electric control is not a part of this invention, no further description is required. A sleeve 6, screw-threaded at its lower end to the pedestal 2 extends upwardly through the controller casing and the controller handle, and exterior to this is a sleeve 7 to which are rigidly secured the controller handle 5 and the drum 8 of the controller. Mounted over the steering-post 1 and over these sleeves is a collar casting 9 which has lug extensions 9$^a$ (see Fig. 6) by which it is bolted to the controller casing, and a lug 9$^b$ with a boring to receive the stem of the pin 10. Mounted over and into this collar casting 9 is a rotatable gear housing 11 with a cap 12 which is bored to receive the post 1 and the stem of the pin 10 to which the gear 14 is splined. The pin 10 is pivotally connected to the lever 3. Within the gear housing 11 is a spur-gear 13 on a squared portion of the steering-post 1, and a spur-gear 14 in mesh with it which is slidably splined to the stem of the pin 10, as clearly shown at 15 in Fig. 5.

When the steering-lever 3 is in the position shown in full lines in Fig. 4, it takes over the upper reduced end of the steering-post 1, and the pin 10, in this position has its stem clear of the boring in the lug extension 9$^b$ of the sleeve casting 9. If now the lever 3 be moved in either direction, the gear 14 being spline-locked at 15 against rotation, the steering-post will rotate in the same direction as the lever 3, the gear casing 11 rotating with the sleeve 9.

If now the steering-lever 3 be thrown over to the position shown in broken outline in Fig. 4, and in full line in Fig. 3, it will no longer fulcrum upon the post 1, and the stem of the pin 10 will drop down into the boring in the lug 9$^b$ in the casting 9 and thus lock the gear casing 11 to the casting 9, so that the gear casing 11 cannot rotate. Movement of the steering-lever 3 in this position will cause rotation of the gear 14 with it and consequent reverse rotation of the gear 13, which is on a squared portion of the steering-post 1. This causes rotation of the steering-post 1 in reverse direction to that of the lever 3.

Thus it will be seen that, in whichever position the steering-lever is used and in whichever direction the truck is propelled, the same lever movement effects the same steering movement, so that the driver may readily change from one seat to the other and give his attention to his business without being distracted by a steering lever which must be reversed in direction of movement to effect a given direction of steering every time the driver changes direction of propulsion of the truck.

Having thus described my invention, I claim:

1. In a steering apparatus of the type described, the combination with a steering post of a steering lever adapted to being thrown from one side to the other to steer the vehicle in either direction of travel and interposed means for causing said lever to rotate said steering post with it when in one position and in reverse direction to it when in the other position.

2. In a steering apparatus of the type described, the combination with a steering post of a steering lever, a lug to which said lever is pivoted to permit swinging said lever to either side of said post, gearing between said post and said lever to cause rotation of said post in one direction when the lever is in one position, and locking means to hold said gears against rotation when the lever is in the opposite position to effect reverse steering movement.

3. In a steering apparatus of the type described, the combination with a steering post and a pedestal for the same, of a steering lever, a pin for said lever, a spur-gear rigid on said post, a spur-gear slidably splined to the stem of said pin, a gear housing pivoted over said post and in which said pin is pivoted, means for locking said gears against rotation when said lever is in one position and permitting gear rotation, and consequent reverse rotation of the steering-post when said lever is in the reverse position.

WILLIAM C. CARR.